(12) United States Patent
Gao et al.

(10) Patent No.: US 11,056,878 B2
(45) Date of Patent: Jul. 6, 2021

(54) OVERVOLTAGE PROTECTION CIRCUIT FOR WIRELESS POWER RECEIVER

(71) Applicant: NXP USA, INC., Austin, TX (US)

(72) Inventors: Xiang Gao, Shanghai (CN); Zhendong Fei, Shanghai (CN); Dechang Wang, Suzhou (CN)

(73) Assignee: NXP USA, Inc., Austin, TX (US)

(*) Notice: Subject to any disclaimer, the term of this patent is extended or adjusted under 35 U.S.C. 154(b) by 218 days.

(21) Appl. No.: 16/438,394

(22) Filed: Jun. 11, 2019

(65) Prior Publication Data
US 2020/0287382 A1   Sep. 10, 2020

(30) Foreign Application Priority Data
Mar. 5, 2019 (CN) .......................... 201910161933.1

(51) Int. Cl.
*H02H 9/04* (2006.01)
*H02M 1/08* (2006.01)
*H02M 7/217* (2006.01)
*H02J 50/10* (2016.01)

(52) U.S. Cl.
CPC ............. *H02H 9/045* (2013.01); *H02J 50/10* (2016.02); *H02M 1/08* (2013.01); *H02M 7/217* (2013.01)

(58) Field of Classification Search
CPC .. H02M 1/08; H02M 7/217; H02M 2001/322; H02M 1/32; H02H 9/045; H02H 9/041; H02H 7/1252; H02J 50/10; H02J 50/12
See application file for complete search history.

(56) References Cited

U.S. PATENT DOCUMENTS

| | | | |
|---|---|---|---|
| 9,130,369 B2 | 9/2015 | Kallal et al. | |
| 9,508,487 B2 | 11/2016 | Von Novak et al. | |
| 9,640,976 B2 | 5/2017 | Chambon et al. | |
| 2010/0321965 A1* | 12/2010 | Sakakibara | H02M 7/797 363/37 |
| 2013/0176653 A1 | 7/2013 | Kim et al. | |
| 2015/0207336 A1* | 7/2015 | Morreale | H02J 7/00034 307/104 |
| 2017/0047781 A1* | 2/2017 | Stanislawski | H02J 7/025 |
| 2018/0241249 A1 | 8/2018 | Von Novak, III et al. | |

(Continued)

OTHER PUBLICATIONS

STMicroelectronics, "Multi-mode Qi/AirFuel inductive wireless power receiver for 15 W applications with transmitter functions", STWLC33 Datasheet, DocID030801 Rev 2, 2017.

*Primary Examiner* — Kyle J Moody
*Assistant Examiner* — Lakaisha Jackson

(57) ABSTRACT

A wireless power receiver has over-voltage protection (OVP) circuitry that performs different techniques for different over-voltage conditions. The OVP circuitry includes controllable resistive clamp circuitry (a resistor in series with a resistor control switch) and controllable capacitive clamp circuitry (a capacitor in series with a capacitor control switch). Based on an output-based feedback signal and a reference signal, comparison circuitry generates comparison signals, based on which a controller selectively enables (i) the resistive clamp circuitry intermittently for a relatively low over-voltage condition and continuously for a higher over-voltage condition and (ii) the capacitive clamp circuit to detune the receiver, both in order to decrease the rectified output voltage.

19 Claims, 5 Drawing Sheets

(56) References Cited

U.S. PATENT DOCUMENTS

2018/0287502 A1\* 10/2018 Watamura ......... H02M 3/33523
2019/0149063 A1\* 5/2019 Onda ..................... H02M 1/32
                                                                                                                     361/30

\* cited by examiner

100

130

400

OVERVOLTAGE PROTECTION CIRCUIT FOR WIRELESS POWER RECEIVER

BACKGROUND

The present invention relates generally to wireless power transfer systems and, more particularly, to a circuit for handling over-voltage conditions in wireless power receiver systems.

FIG. 1 is a simplified schematic block diagram of a conventional wireless power transfer system 100 having a wireless power transmitter (TX) 110 and a wireless power receiver (RX) 130. The wireless power transmitter 110 includes power module 112, TX resonance network 114, and TX inductor coil 116, while the wireless power receiver 130 includes RX inductor coil 132, RX resonance network 134, synchronous rectifier 136, communication controller 138, and communication processor 140. The TX and RX inductor coils 116 and 132 form an inductive interface 120 for wirelessly (i.e., magnetically) transferring (i) power from the power transmitter 110 to the power receiver 130 and (ii) communications signals between the power transmitter 110 and the power receiver 120. The resonance networks 114 and 134 are designed to ensure that the output impedance of the power transmitter 110 matches the input impedance of the power receiver 130 to provide efficient wireless power transfer.

For power transfer, the power module 112 applies an AC power signal 113 to the TX inductor coil 116 via the TX resonance network 114. The AC power signal 113 induces an AC power signal 135 in the RX inductor coil 132, which is applied via the RX resonance network 134 to the rectifier 136. The rectifier 136 rectifies the AC power signal 135 into a DC power signal VRECT that is applied to power the system loading.

The communication controller 138 generates communication signals that are transmitted by the communication processor 140 through the inductive interface 120 to the power transmitter 110. In particular, the communication controller 138 monitors the received power from the power transmitter 110. The received power can be estimated easily by measuring VRECT under a given load current. Thus, the communication controller 138 measures VRECT and, if appropriate, transmits communication signals using the inductive interface 120 to (i) instruct the power transmitter 110 to increase the power transfer level if VRECT is too low and (ii) instruct the power transmitter 110 to decrease the power transfer level if VRECT is too high. Those skilled in the art will understand that, in other wireless power transfer systems, the wireless power transfer path is separate and distinct from the wireless data communication path.

In some wireless power transfer systems, the power receiver 130 is part of a consumer device, such as a cell phone, that is wirelessly charged by placing the consumer device on a wireless charger comprising the power transmitter 110. If and when the consumer device is moved during the wireless charging process, the magnetic coupling between the TX inductor coil 116 and the RX inductor coil 132 can change significantly, which can result in a rapid increase in the rectified output voltage VRECT to voltage levels that can damage the downstream electronics of the consumer device (not shown in FIG. 1). Such voltage jumps might not be effectively handled using the conventional control loop involving the communication controller 138 transmitting power control messages back to the power transmitter 110.

FIG. 2 is a schematic block diagram of a portion of the power receiver 130 of FIG. 1 with circuitry for performing one conventional type of over-voltage protection. As shown in FIG. 2, in addition to the RX inductor coil 132, the RX resonance network 134, and the rectifier 136, the power receiver 130 includes resistor divider circuitry 240, comparator 260, and capacitive clamp circuitry 290, which includes clamp capacitors C1 and C2 in series with capacitor-control (e.g., n-type transistor) switches S1 and S2, respectively.

The resistor divider circuitry 240 divides down the output voltage Vrect by a suitable factor to provide a lower-voltage feedback signal Vfb at one input to the comparator 260, which also receives a suitable reference voltage Vref. If the voltage level of Vfb is less than the voltage level of Vref, then the switch-control signal 262 produced by the comparator 260 is low, the switches S1 and S2 are off, and the impedance of the RX resonance network 134 will continue to match the impedance of the TX resonance network 114 of FIG. 1.

When, however, there is an over-voltage condition at the output Vrect, such that the voltage level of Vfb exceeds the voltage level of Vref, then the switch-control signal 262 produced by the comparator 260 will be high, and the switches S1 and S2 are turned on thereby connecting the nodes AC1 and AC2 of the PRX resonance network 134 to ground via the capacitors C1 and C2, respectively, such that the resonance frequency of the RX resonance network 134 will move far away from the operation frequency of the TX resonance network 114 of FIG. 1. As a result of the newly imposed resonance frequency mismatch, the amount of power received at the RX inductor coil 132 will sharply decrease, thereby reducing the voltage level at the output Vrect, limiting the duration of the over-voltage condition, and hopefully preventing permanent damage to the downstream circuitry.

Other conventional techniques for limiting over-voltage conditions involve connecting resistive clamp circuitry comprising a resistor in series with a resistor-control switch and connected to ground either before or after the rectifier 136. In this case, when the comparator 260 detects an over-voltage condition, the resistor-control switch is turned on to shunt power away from the Vrect output.

It would be advantageous to have a comprehensive over-voltage protection system for a wireless power transfer system.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION

Figure 1:
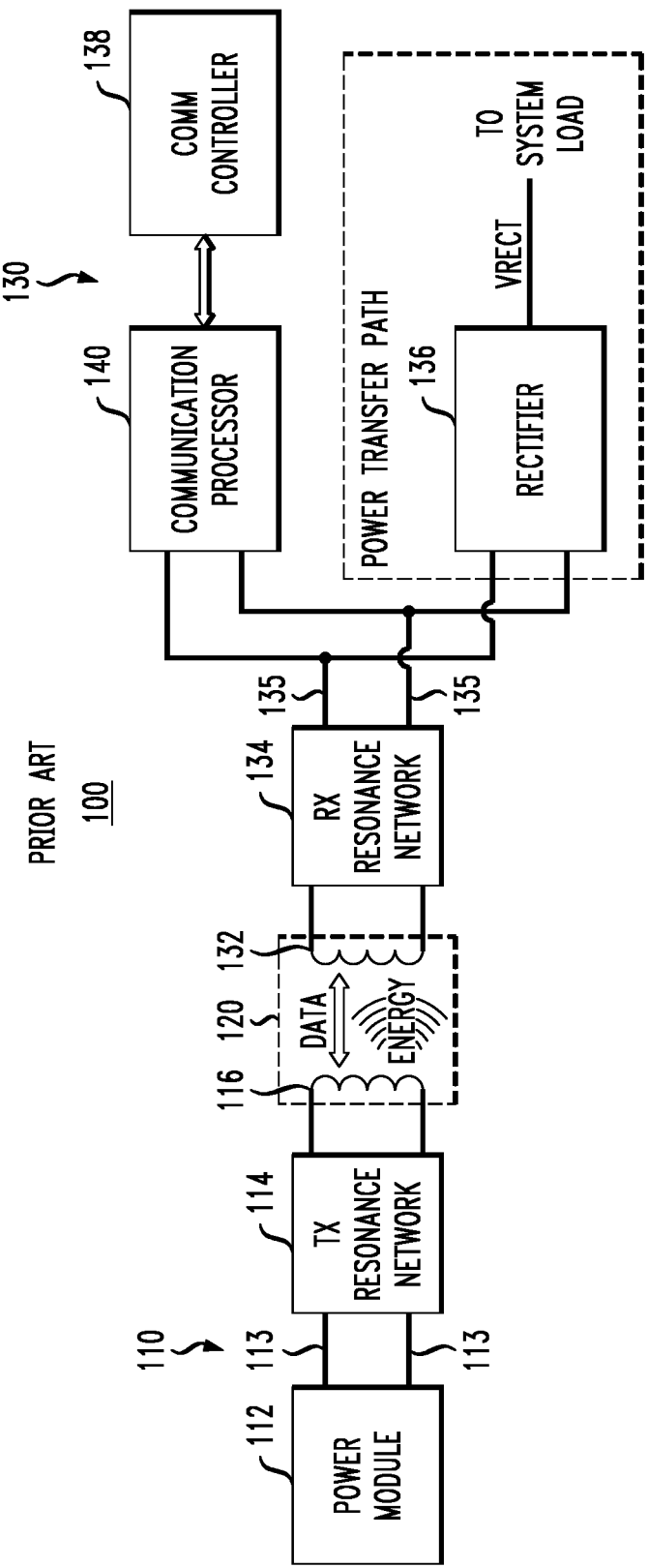
FIG. 1 is a simplified schematic block diagram of a conventional wireless power transfer system.
Figure 2:
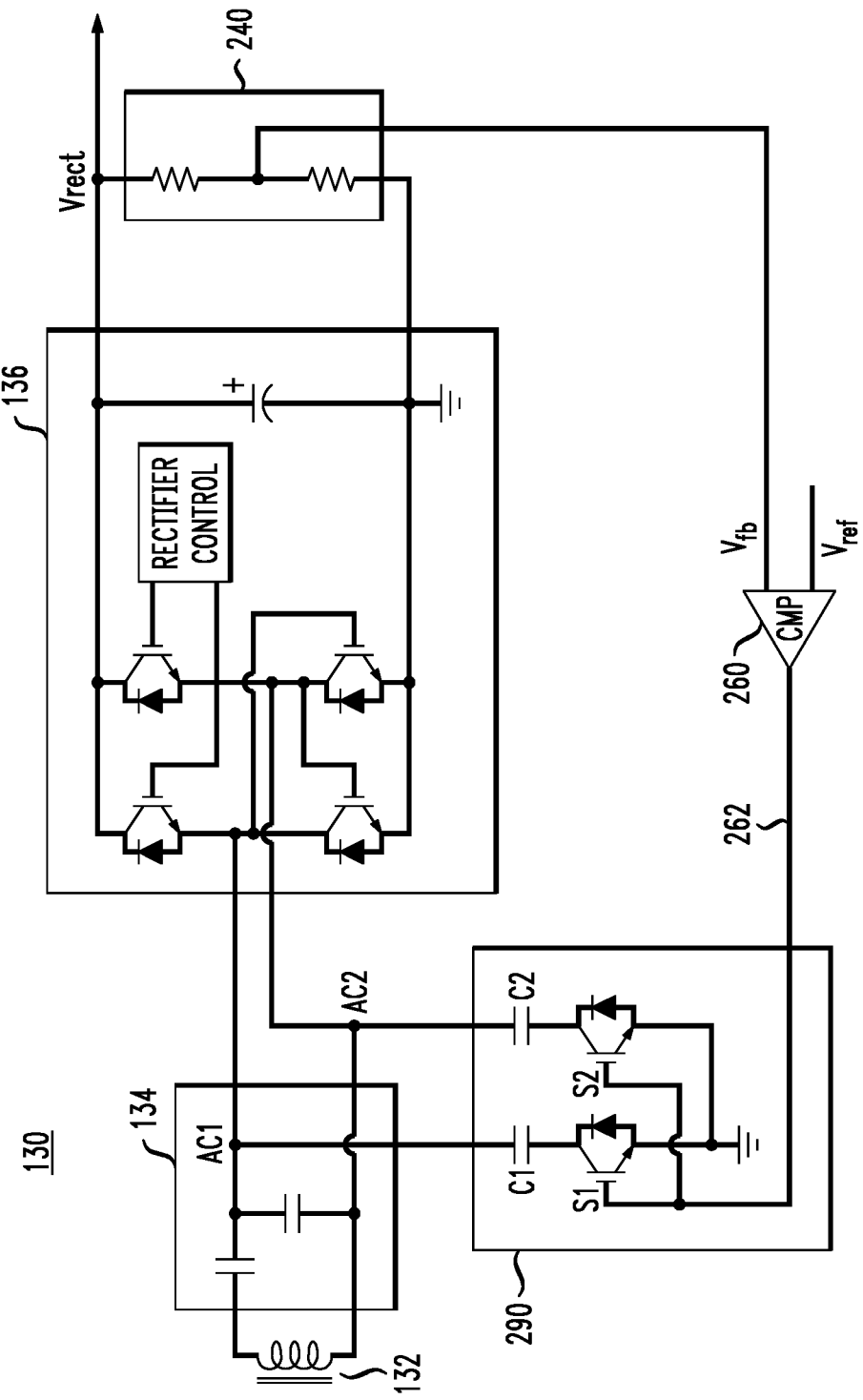
FIG. 2 is a schematic block diagram of a portion of the power receiver of FIG. 1 with circuitry for performing one conventional type of over-voltage protection.

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

The conventional techniques for handling over-voltage conditions in a wireless power receiver are static and lack flexibility. The receiver can take only the predefined action (e.g., turning on a switch) when the rectified voltage Vrect exceeds a fixed threshold. The conventional capacitive clamp circuitry and the conventional resistive clamp circuitry described previously are typically designed to provide satisfactory results for most over-voltage situations, but are not optimal for all situations. The protection might not even be effective for certain wireless power transmitters.

According to embodiments of the present invention, a wireless power receiver has over-voltage protection circuitry that can handle different types of over-voltage conditions in different ways to provide greater flexibility and more-effective results.

In one embodiment, the present invention is a wireless power receiver. The receiver comprises an inductor coil configured to be magnetically coupled with a wireless power transmitter to wirelessly receive power from the wireless power transmitter. A rectifier generates a rectified output voltage at an output port of the receiver. A resonance network is connected between the inductor coil and the rectifier. Resistive clamp circuitry, which is connected to other circuitry in the receiver, comprises a resistor connected in series with a resistor-control switch. Comparison circuitry compares a feedback signal based on the rectified output voltage to at least one reference signal and control circuitry selectively controls the resistive clamp circuitry based on at least one comparison signal received from the comparison circuitry. If the feedback signal is greater than a first reference voltage level, then the control circuitry intermittently turns on and off the resistor-control switch in order to reduce the rectified output voltage.

In another embodiment, the present invention is a wireless power receiver including an inductor coil configured to be magnetically coupled with a wireless power transmitter to wirelessly receive power from the wireless power transmitter, a rectifier that generates a rectified output voltage at an output port of the receiver, and a resonance network connected between the inductor coil and the rectifier. Clamp circuitry is connected at least one of the output port and the resonance network. Comparison circuitry compares a feedback signal based on the rectified output voltage to at least one reference signal and control circuitry selectively controls the clamp circuitry based on at least one comparison signal received from the comparison circuitry. If the feedback signal is greater than a first reference voltage level, then the control circuitry controls the clamp circuitry to perform a first operation to reduce the rectified output voltage. If the feedback signal is greater than a second reference voltage level that is greater than the first reference voltage level, then the control circuitry controls the clamp circuitry to perform a second operation different from the first operation to reduce the rectified output voltage.

Figure 3:
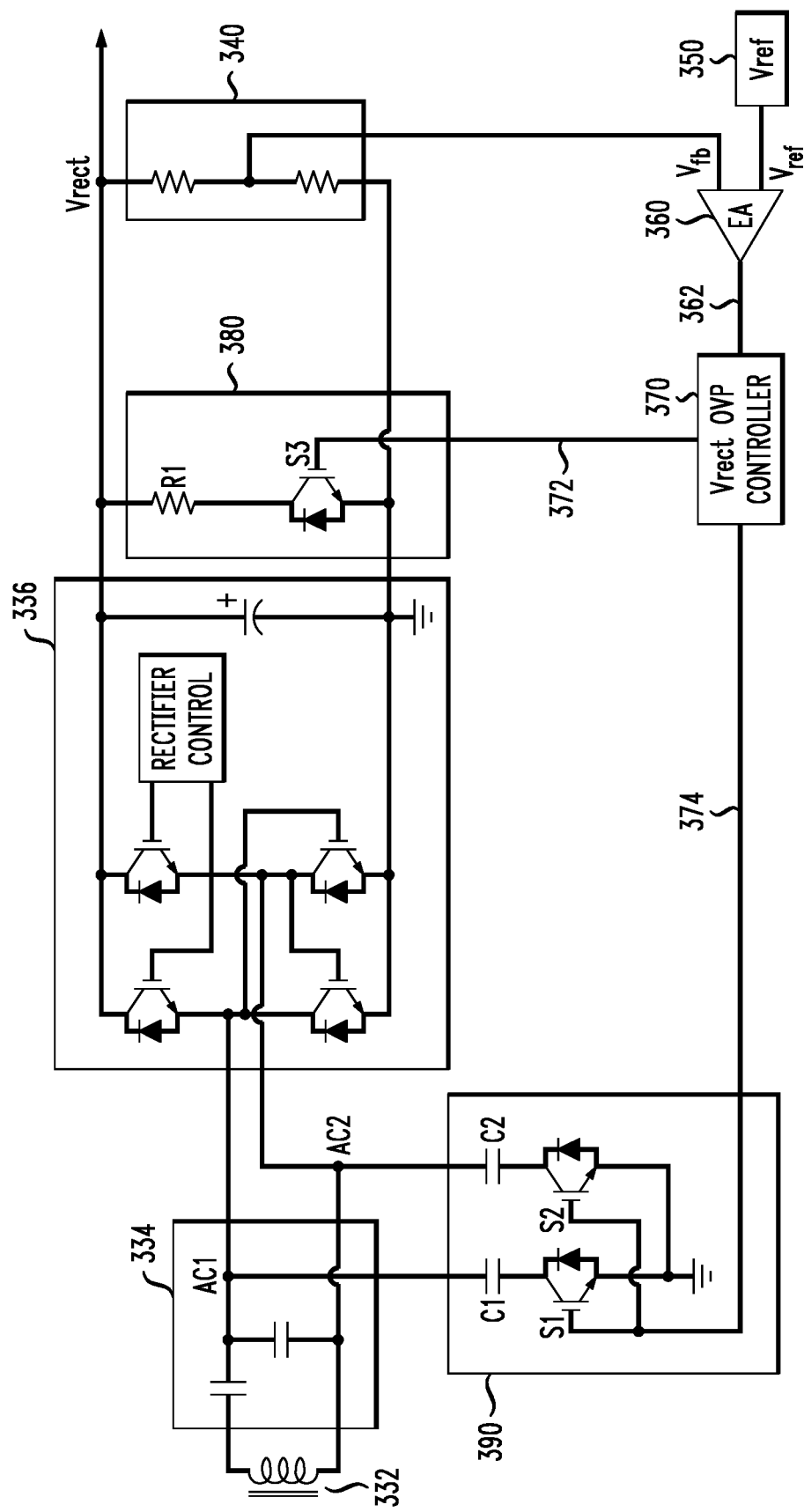
FIGS. 3-5 are schematic block diagrams of a portion of a wireless power receiver having over-voltage protection circuitry that can perform different techniques for over-voltage protection in accordance with three different embodiments of the present invention.

Referring now to FIG. 3, a schematic block diagram of a portion of a wireless power receiver 300 having over-voltage protection circuitry that can perform different techniques for over-voltage protection, according to one embodiment of the invention, is shown. In addition to RX inductor coil 332, RX resonance network 334, rectifier 336, resistor divider circuitry 340, and capacitive clamp circuitry 390, which may be identical to the corresponding elements of the power receiver 130 of FIG. 1, the power receiver 300 includes error amplifier 360, resistive clamp circuitry 380 (which includes clamp resistor R1 in series with resistor-control switch S3), reference voltage generator, and Vrect over-voltage protection (OVP) controller 370, which generates resistor-control signal 372 to control the resistor-control switch S3 in the resistive clamp circuitry 380 and capacitor-control signal 374 to control the capacitor-control switches S1 and S2 in the capacitive clamp circuitry 390.

The resistor divider circuitry 340 divides down the output voltage Vrect by a suitable factor to provide a lower-voltage feedback signal Vfb at one input of the error amplifier 360, which also receives a reference voltage Vref generated by the reference voltage generator 350.

The error amplifier 360 generates an error signal 362 that is based on the difference between the voltage level of Vfb and the voltage level of Vref. Depending on the voltage level of the error signal 362, the Vrect OVP controller 370 will generate different outputs for the resistor- and capacitor-control signals 372 and 374.

In an example implementation, under normal operating conditions (i.e., no over-voltage condition at the output Vrect), the error signal 362 is less than a first voltage threshold level Vth1, and the Vrect OVP controller 370 generates the resistor- and capacitor-control signals 372 and 374 to keep all three switches S1-S3 off. In that case, there will be no over-voltage condition at the Vref output, and the power receiver 300 will operate in its normal mode.

If and when the error signal 362 is greater than Vth1, but less than a second (i.e., higher) voltage threshold level Vth2, then the Vrect OVP controller 370 generates the resistor-control signal 372 to be a pulse-width modulation (PWM) control signal that repeatedly turns on and off the resistor-control switch S3, while generating the capacitor-control signal 374 to keep the capacitor-control switches S1 and S2 off. As a result, power will be shunted away from the output Vrect through the clamp resistor R1 whenever the resistor-control switch S3 is on. The duty cycle of the PWM control signal 372 determines the net rate at which power is shunted away from the output Vrect, with higher duty cycles implying higher rates.

If and when the error signal 362 is greater than Vth2, but less than a third (i.e., highest) voltage threshold level Vth3, then the Vrect OVP controller 370 generates the resistor-control signal 372 to turn on and keep on the resistor-control switch S3, while generating the capacitor-control signal 374 to keep the capacitor-control switches S1 and S2 off. As a result, power will be continuously shunted away from the output Vrect through the clamp resistor R1.

If and when the error signal 362 is greater than Vth3, then the Vrect OVP controller 370 generates the resistor-control signal 372 to turn on and keep on the resistor-control switch S3 and also generates the capacitor-control signal 374 to turn on and keep on the capacitor-control switches S1 and S2. As a result, the RX resonance network 334 will be detuned by the capacitors C1 and C2, thereby reducing the amount of power received wirelessly by the RX inductor coil 332, while still continuously shunting power away from the output Vrect through the clamp resistor R1.

In this way, the over-voltage protection circuitry of FIG. 3 implements three different techniques for handling higher and higher over-voltage conditions at the Vrect output node.

Figure 4:
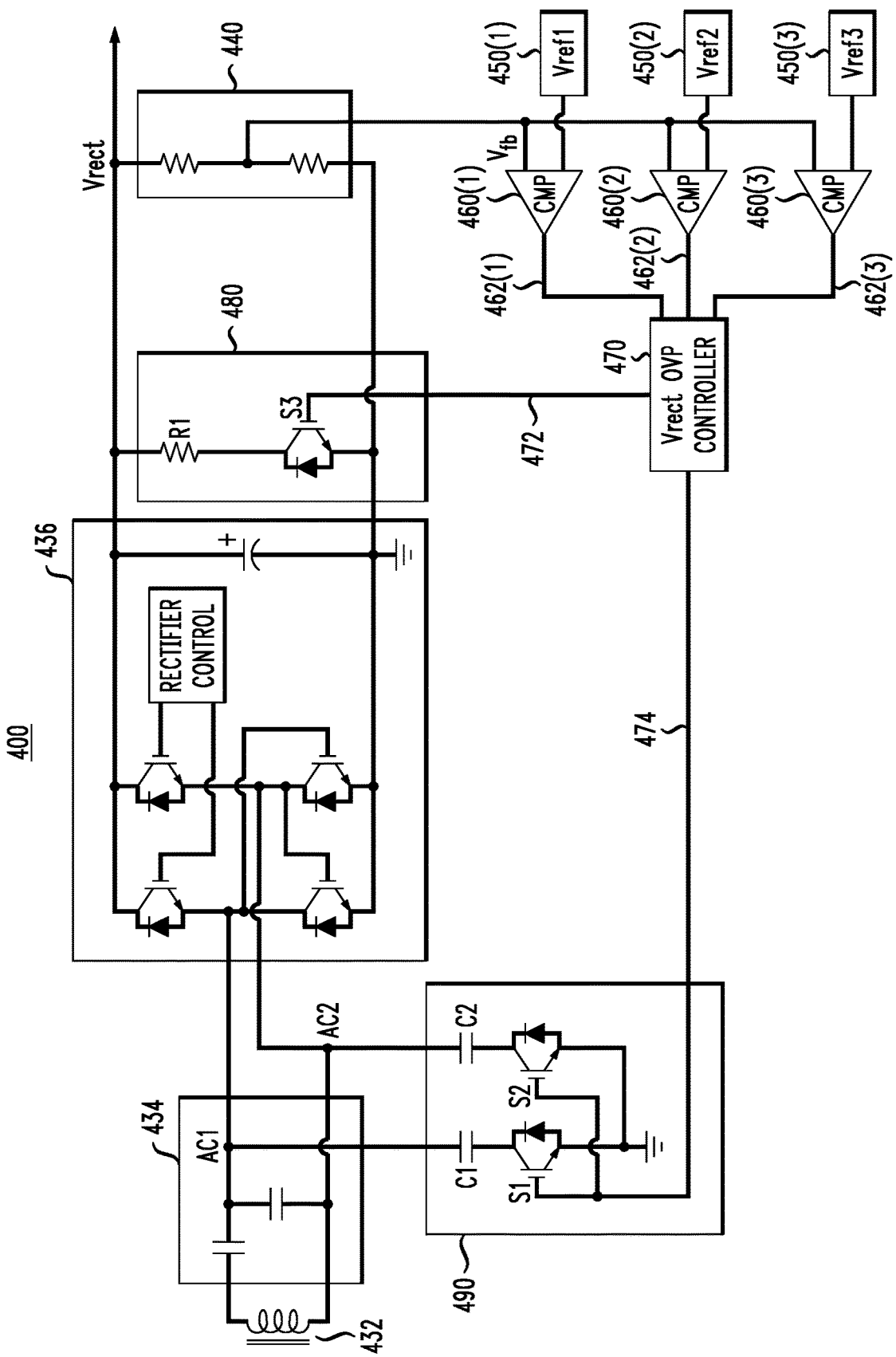

FIG. 4 is a schematic block diagram of a portion of a wireless power receiver 400 having over-voltage protection circuitry that can perform different techniques for over-voltage protection, according to another embodiment of the invention. The wireless power receiver 400 is analogous to the wireless power receiver 300 of FIG. 3 with similar elements identified using analogous labels, except that, instead of the error amplifier 360 and the single reference voltage generator 350 of FIG. 3, the wireless power receiver 400 has three comparators 460(1)-460(3) and three corresponding reference voltage generators 450(1)-450(3) generating three different reference voltages Vref1-Vref3, where Vref1<Vref2<Vref3.

In an example implementation, under normal operating conditions, the feedback signal Vfb is less than Vref1, the comparator output signals 462(1)-462(3) are all low, and the Vrect OVP controller 470 generates the resistor- and capacitor-control signals 472 and 474 to keep all three switches S1-S3 off, similar to when the error signal 362 is less than Vth1 in FIG. 3.

If and when the feedback signal Vfb is greater than Vref1, but less than Vref2, then the comparator output signal 462(1) is high, the comparator output signals 462(2) and 462(3) are low, and the Vrect OVP controller 470 generates the resistor-control signal 472 to be a PWM control signal that repeatedly turns on and off the resistor-control switch S3, while generating the capacitor-control signal 474 to keep the capacitor-control switches S1 and S2 off, similar to when the error signal 362 is between Vth1 and Vth2 in FIG. 3.

If and when the feedback signal Vfb is greater than Vref2, but less than Vref3, then the comparator output signals 462(1) and 462(2) are high, the comparator output signal 462(3) is low, and the Vrect OVP controller 470 generates the resistor-control signal 472 to turn on and keep on the resistor-control switch S3, while generating the capacitor-control signal 474 to keep the capacitor-control switches S1 and S2 off, similar to when the error signal 362 is between Vth2 and Vth3 in FIG. 3.

If and when the feedback signal Vfb is greater than Vref3, then the comparator output signals 462(1)-462(3) are all high, and the Vrect OVP controller 470 generates the resistor-control signal 472 to turn on and keep on the resistor-control switch S3 and also generates the capacitor-control signal 474 to turn on and keep on the capacitor-control switches S1 and S2, similar to when the error signal 362 is greater than Vth3 in FIG. 3.

In this way, like the over-voltage protection circuitry of FIG. 3, the over-voltage protection circuitry of FIG. 4 implements three different techniques for handling higher and higher over-voltage conditions at the Vrect output node.

Figure 5:
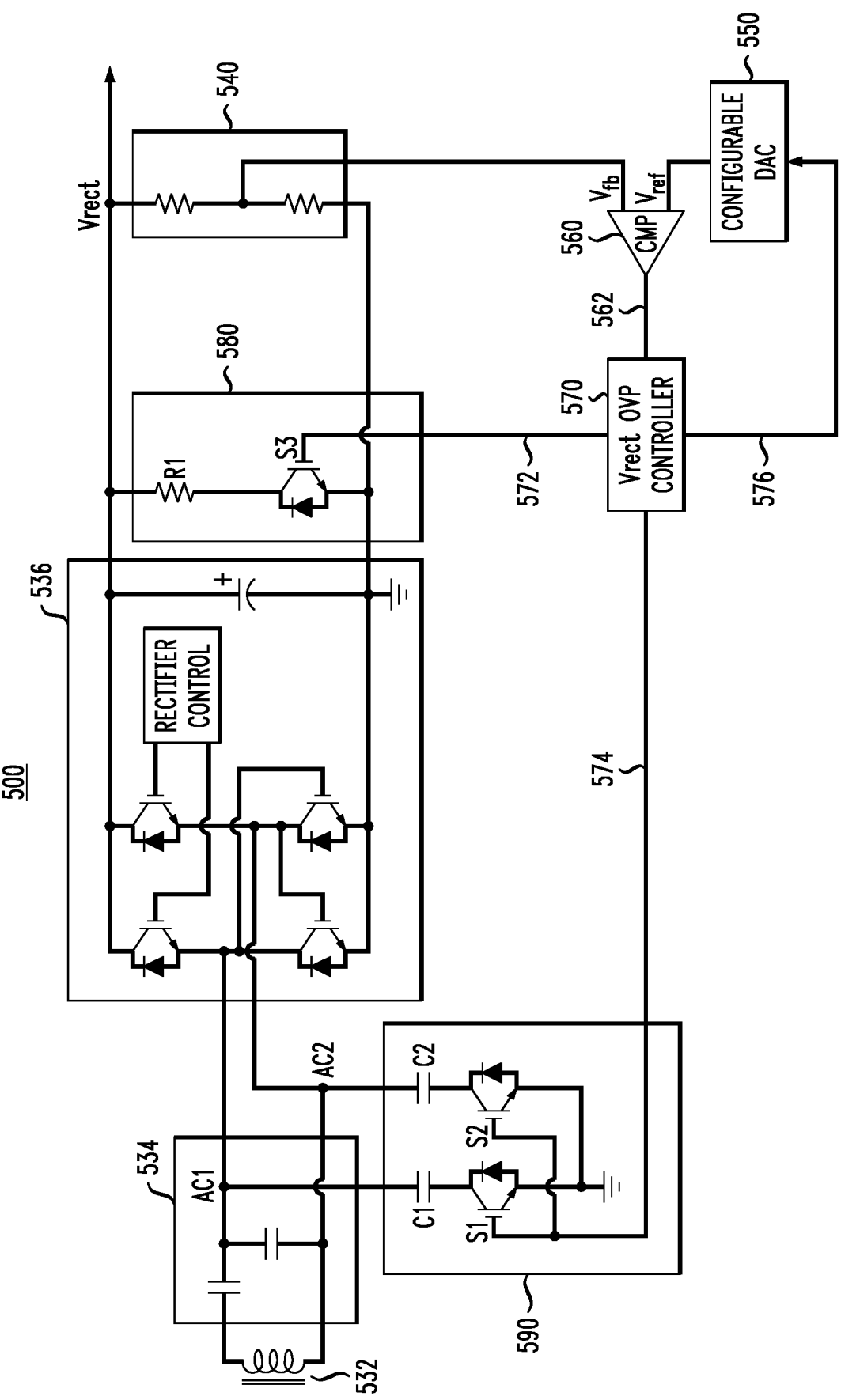

FIG. 5 is a schematic block diagram of a portion of a wireless power receiver 500 having over-voltage protection circuitry that can perform different techniques for over-voltage protection, according to another embodiment of the invention. The wireless power receiver 500 is analogous to the wireless power receiver 400 with similar elements identified using analogous labels, except that, instead of the three comparators 460(1)-460(3) and the three corresponding reference voltage generators 450(1)-450(3), the wireless power receiver 500 has a single comparator 560 and a configurable digital-to-analog converter (DAC) 550, which is controlled by the DAC control signal 5X from the Vrect OVP controller 570 to generate any of the three different reference voltages Vref1-Vref3 of FIG. 4.

In an example implementation, the Vrect OVP controller 570 initially controls the configurable DAC 550 to generate the reference voltage Vref1. Under normal operating conditions, the feedback signal Vfb is less than Vref1, the comparator output signals 562 is low, and the Vrect OVP controller 570 generates the resistor- and capacitor-control signals 572 and 574 to keep all three switches S1-S3 off, similar to when the feedback signal Vfb is less than Vref1 in FIG. 4.

If and when the feedback signal Vfb becomes greater than Vref1, then the comparator output signal 562 is high, and the Vrect OVP controller 570 generates the resistor-control signal 572 to be a PWM control signal that repeatedly turns on and off the resistor-control switch S3, while generating the capacitor-control signal 574 to keep the capacitor-control switches S1 and S2 off, similar to when the feedback signal Vfb is between Vref1 and Vref2 in FIG. 4. In addition, the Vrect OVP controller 570 generates the DAC control signal 5X to instruct the configurable DAC 550 to generate the reference voltage Vref2.

If and when the feedback signal Vfb becomes greater than Vref2, then the comparator output signal 562 is high, and the Vrect OVP controller 570 generates the resistor-control signal 572 to turn on and keep on the resistor-control switch S3, while generating the capacitor-control signal 574 to keep the capacitor-control switches S1 and S2 off, similar to when the feedback signal Vfb is between Vref2 and Vref3 in FIG. 4. In addition, the Vrect OVP controller 570 generates the DAC control signal 5X to instruct the configurable DAC 550 to generate the reference voltage Vref3.

If and when the feedback signal Vfb is greater than Vref3, then the comparator output signals 562 is high, and the Vrect OVP controller 570 generates the resistor-control signal 572 to turn on and keep on the resistor-control switch S3 and also generates the capacitor-control signal 574 to turn on and keep on the capacitor-control switches S1 and S2, similar to when the feedback signal Vfb is greater than Vref3 in FIG. 4.

In this way, like the over-voltage protection circuitries of FIGS. 3 and 4, the over-voltage protection circuitry of FIG. 5 implements three different techniques for handling higher and higher over-voltage conditions at the Vrect output node.

Those skilled in the art will understand that alternative embodiments of the invention may handle over-voltage conditions by implementing different over-voltage protection techniques and/or different numbers of over-voltage protection techniques.

In one possible implementation of the over-voltage protection circuitry of FIG. 3, the last set of control signals 372 and 374 that were generated by the Vrect OVP controller 370 to handle an over-voltage condition are maintained until the error signal 362 drops below the first threshold voltage level Vth1, and the over-voltage condition no longer exists. In another possible implementation, as the error signal 362 drops from above Vth2 or above Vth3 to eventually below Vth1, the Vrect OVP controller 370 modifies the control signals 372 and 374 multiple times based on the current level of the error signal 362. Either way, the over-voltage protection scheme of FIG. 3 will handle different over-voltage conditions in different ways with more and more drastic measures taken for higher and higher over-voltage levels. Analogous implementations exist for the over-voltage protection circuitries of FIGS. 4 and 5.

In some implementations, when the error signal 362 is between Vth1 and Vth2, the duty cycle of the PWM control signal generated by the OVP controller is a dynamic function of the magnitude of the error signal 362 such that the duty cycle increases (and decreases) as the error signal 362 increases (and decreases). Analogous implementations exist for the over-voltage protection circuitries of FIGS. 4 and 5.

Although the invention has been described in the context of over-voltage protection schemes having three different levels of protection, other embodiments may have other numbers of different levels of protection, for example, using the configurability of the PWM duty cycle and the error amplifier.

Although the invention has been described in the context of the resistive clamp circuitry 380/480/580 located downstream of the rectifier 336/436/536, in alternative embodiments, the resistive clamp circuitry 380/480/580 can be located upstream of the rectifier 336/436/536, although such solutions might not be as effective.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. An article of manufacture comprising a wireless power receiver, the receiver comprising:
    an inductor coil configured to be magnetically coupled with a wireless power transmitter to wirelessly receive power from the wireless power transmitter;
    a rectifier that generates a rectified output voltage at an output port of the receiver;
    a resonance network connected between the inductor coil and the rectifier;
    resistive clamp circuitry connected to other circuitry in the receiver, the resistive clamp circuitry comprising a resistor connected in series with a resistor-control switch;
    comparison circuitry that compares a feedback signal based on the rectified output voltage to at least one reference signal; and
    control circuitry that selectively controls the resistive clamp circuitry based on at least one comparison signal received from the comparison circuitry, wherein:
        if the feedback signal is greater than a first reference voltage level, then the control circuitry intermittently turns on and off the resistor-control switch in order to reduce the rectified output voltage.

2. The article of claim 1, wherein the resistive clamp circuitry is connected between the output port and ground.

3. The article of claim 1, wherein:
    if the feedback signal is greater than a second reference voltage level that is greater than the first reference voltage level, then the control circuitry turns on and leaves on the resistor-control switch in order to reduce the rectified output voltage.

4. The article of claim 3, further comprising capacitive clamp circuitry connected to the resonance network, the capacitive clamp circuitry comprising at least one capacitor connected in series with at least one capacitor-control switch, wherein:
    if the feedback signal is greater than a third reference voltage level that is greater than the second reference voltage level, then the control circuitry turns on and leaves on the at least one capacitor-control switch to detune the resonance network in order to reduce the rectified output voltage.

5. The article of claim 1, wherein the control circuitry applies a pulse-width modulation (PWM) control signal to intermittently turn on and off the resistor-control switch.

6. The article of claim 5, wherein the control circuitry generates the duty cycle of the PWM control signal to be dependent on the rectified output voltage.

7. The article of claim 1, wherein:
    the comparison circuitry compares the feedback signal to multiple different reference signals and generates multiple corresponding comparison signals, each comparison signal indicating whether the feedback signal is greater than the corresponding reference signal; and
    the control circuitry selectively controls the resistive clamp circuitry based on the multiple comparison signals.

8. The article of claim 1, wherein:
    the comparison circuitry generates an error signal whose magnitude is a function of a difference between the feedback signal and the at least one reference signal; and
    the control circuitry selectively controls the resistive clamp circuitry based on the magnitude of the error signal.

9. The article of claim 1, further comprising a resistor divider that generates the feedback signal based on the rectified output voltage.

10. The article of claim 1, further comprising the wireless power transmitter.

11. A wireless power receiver, comprising:
an inductor coil configured to be magnetically coupled with a wireless power transmitter to wirelessly receive power from the wireless power transmitter;
a rectifier that generates a rectified output voltage at an output port of the receiver;
a resonance network connected between the inductor coil and the rectifier;
clamp circuitry connected at least one of the output port and the resonance network;
comparison circuitry that compares a feedback signal based on the rectified output voltage to at least one reference signal; and
control circuitry that selectively controls the clamp circuitry based on at least one comparison signal received from the comparison circuitry, wherein:
if the feedback signal is greater than a first reference voltage level, then the control circuitry controls the clamp circuitry to perform a first operation to reduce the rectified output voltage; and
if the feedback signal is greater than a second reference voltage level that is greater than the first reference voltage level, then the control circuitry controls the clamp circuitry to perform a second operation different from the first operation to reduce the rectified output voltage.

12. The wireless power receiver of claim 11, wherein:
the clamp circuitry comprises resistive clamp circuitry connected to other circuitry in the receiver, the resistive clamp circuitry comprising a resistor connected in series with a resistor-control switch;
if the feedback signal is greater than the first reference voltage level, then the control circuitry intermittently turns on and off the resistor-control switch in order to reduce the rectified output voltage; and
if the feedback signal is greater than the second reference voltage level, then the control circuitry turns on and leaves on the resistor-control switch in order to reduce the rectified output voltage.

13. The wireless power receiver of claim 12, wherein the control circuitry applies a pulse-width modulation (PWM) control signal to intermittently turn on and off the resistor-control switch.

14. The wireless power receiver of claim 13, wherein the control circuitry generates the duty cycle of the PWM control signal to be dependent on the rectified output voltage.

15. The wireless power receiver of claim 12, wherein the resistive clamp circuitry is connected between the output port and ground.

16. The wireless power receiver of claim 11, wherein:
the control circuitry further comprises capacitive clamp circuitry connected to the resonance network, the capacitive clamp circuitry comprising at least one capacitor connected in series with at least one capacitor-control switch;
if the feedback signal is greater than a third reference voltage level that is greater than the second reference voltage level, then the control circuitry turns on and leaves on the capacitor-control switch to detune the resonance network to reduce the rectified output voltage.

17. The wireless power receiver of claim 11, wherein:
the comparison circuitry compares the feedback signal to multiple different reference signals and generates multiple corresponding comparison signals, each comparison signal indicating whether the feedback signal is greater than the corresponding reference signal; and
the control circuitry selectively controls the clamp circuitry based on the multiple comparison signals received from the comparison circuitry.

18. The wireless power receiver of claim 11, wherein:
the comparison circuitry compares the feedback signal to a reference signal and generates an error signal whose magnitude is a function of a difference between the feedback signal and the reference signal; and
the control circuitry selectively controls the clamp circuitry based on the magnitude of the error signal.

19. The wireless power receiver of claim 11, further comprising a resistor divider configured to generate the feedback signal based on the rectified output voltage.

* * * * *